United States Patent
Takao

(10) Patent No.: US 8,696,387 B2
(45) Date of Patent: Apr. 15, 2014

(54) CARD ADAPTER AND ELECTRONIC DEVICE

(75) Inventor: Kazuaki Takao, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 80 days.

(21) Appl. No.: 13/437,534

(22) Filed: Apr. 2, 2012

(65) Prior Publication Data

US 2012/0258630 A1    Oct. 11, 2012

(30) Foreign Application Priority Data

Apr. 5, 2011   (JP) ................................ 2011-083877

(51) Int. Cl.
    *H01R 24/00*        (2011.01)
(52) U.S. Cl.
    USPC .......................................... 439/630; 439/638
(58) Field of Classification Search
    USPC .......... 439/267, 630, 638, 945, 946; 361/737; 235/441, 492
    See application file for complete search history.

(56) References Cited

U.S. PATENT DOCUMENTS

| | | | |
|---|---|---|---|
| 5,091,618 A * | 2/1992 | Takahashi | 235/441 |
| 5,286,957 A * | 2/1994 | Defrasne | 235/441 |
| 5,898,159 A * | 4/1999 | Huang | 235/441 |
| 5,955,722 A * | 9/1999 | Kurz et al. | 235/479 |
| 6,015,311 A * | 1/2000 | Benjamin et al. | 439/267 |
| 6,050,848 A * | 4/2000 | Yao | 439/483 |
| 6,068,516 A * | 5/2000 | Chang | 439/633 |
| 7,108,557 B2 | 9/2006 | Kikuchi et al. | |
| 7,118,421 B2 * | 10/2006 | Kadonaga et al. | 439/638 |
| 7,214,099 B2 * | 5/2007 | Kikuchi et al. | 439/630 |
| 7,265,989 B2 * | 9/2007 | Son et al. | 361/737 |
| 7,350,705 B1 * | 4/2008 | Frederick et al. | 235/441 |

FOREIGN PATENT DOCUMENTS

| | | |
|---|---|---|
| CN | 1214481 A | 4/1999 |
| CN | 1698240 A | 11/2005 |
| CN | 1738106 A | 2/2006 |
| CN | 1768317 A | 5/2006 |
| JP | 03-027984 | 2/1991 |

OTHER PUBLICATIONS

Chinese Office Action mailed Jan. 6, 2014 for corresponding Chinese Application No. 201210096625.3, with English-language translation.

* cited by examiner

*Primary Examiner* — Thanh Tam Le
(74) *Attorney, Agent, or Firm* — Fujitsu Patent Center

(57) ABSTRACT

A card adapter is disposed in a slot of an electronic device. The card adapter includes a slit which is configured such that a card with information written therein is inserted into the slit, an opening portion which reaches from an outer surface of the card adapter to the slit, and a fall-out prevention member which is disposed in the opening portion and which is movable in a thickness direction of the card adapter. When the card is inserted into the slit, the fall-out prevention member moves in the thickness direction of the card adapter and a portion thereof protrudes from the outer surface of the card adapter to come into contact with an inner wall surface of a case of the electronic device.

4 Claims, 8 Drawing Sheets

US 8,696,387 B2

CARD ADAPTER AND ELECTRONIC DEVICE

CROSS-REFERENCE TO RELATED APPLICATION

This application is based upon and claims and the benefit of priority of the prior Japanese Patent Application No. 2011-083877, filed on Apr. 5, 2011, the entire contents of which are incorporated herein by reference.

FIELD

The embodiment discussed herein is related to a card adapter interposed between a card with information recorded therein and a device for reading the information from the card, and also to an electronic device including the card adapter.

BACKGROUND

In recent years, a smart card incorporating an IC chip is widely used. The smart card may be used also as an ID (Identification) card for personal identification. In this respect, there is a proposal to utilize the smart card to prevent unauthorized use of a personal computer.

Meanwhile, many personal computers have an expansion card slot into which a PCMCIA card or an EXPRESS card standardized by the PCMCIA (Personal Computer Memory Card International Association) is to be inserted. In order to read the information in the smart card by using this expansion card slot, a card adapter complying with the PCMCIA card standard or the EXPRESS card standard may be required.

[Patent Document 1] Japanese Laid-open Patent Publication No. 03-27984

SUMMARY

According to an aspect of the disclosed technique, there is provided a card adapter electrically connecting a card with information written therein and an electronic device to each other, which includes an adapter main body, a slit provided in the adapter main body and configured such that the card is inserted into the slit, an opening portion reaching from an outer surface of the adapter main body to the slit, and a fall-out prevention member disposed in the opening portion and being movable in a thickness direction of the adapter main body. Here, when the card is inserted into the slit, the fall-out prevention member comes into contact with the card to be pushed up in the thickness direction of the adapter main body, and a portion of the fall-out prevention member protrudes from the outer surface of the adapter main body.

According to another aspect of the disclosed technique, there is provided an electronic device including a case having a slot, and a card adapter configured to be installed in the slot and to electrically connect the electronic device and a card with information written therein to each other. Here, the card adapter includes an adapter main body, a slit provided in the adapter main body and configured such that the card is inserted into the slit, an opening portion reaching from an outer surface of the adapter main body to the slit, and a fall-out prevention member disposed in the opening portion and being movable in a thickness direction of the adapter main body. When the card is inserted into the slit, the fall-out prevention member comes into contact with the card to be pushed up in the thickness direction of the adapter main body, and a portion of the fall-out prevention member protrudes from the outer surface of the adapter main body to come into contact with an inner wall surface of the case.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENT

Before describing an embodiment, a prelude for facilitating understanding of the embodiment is described below.

Figure 1:
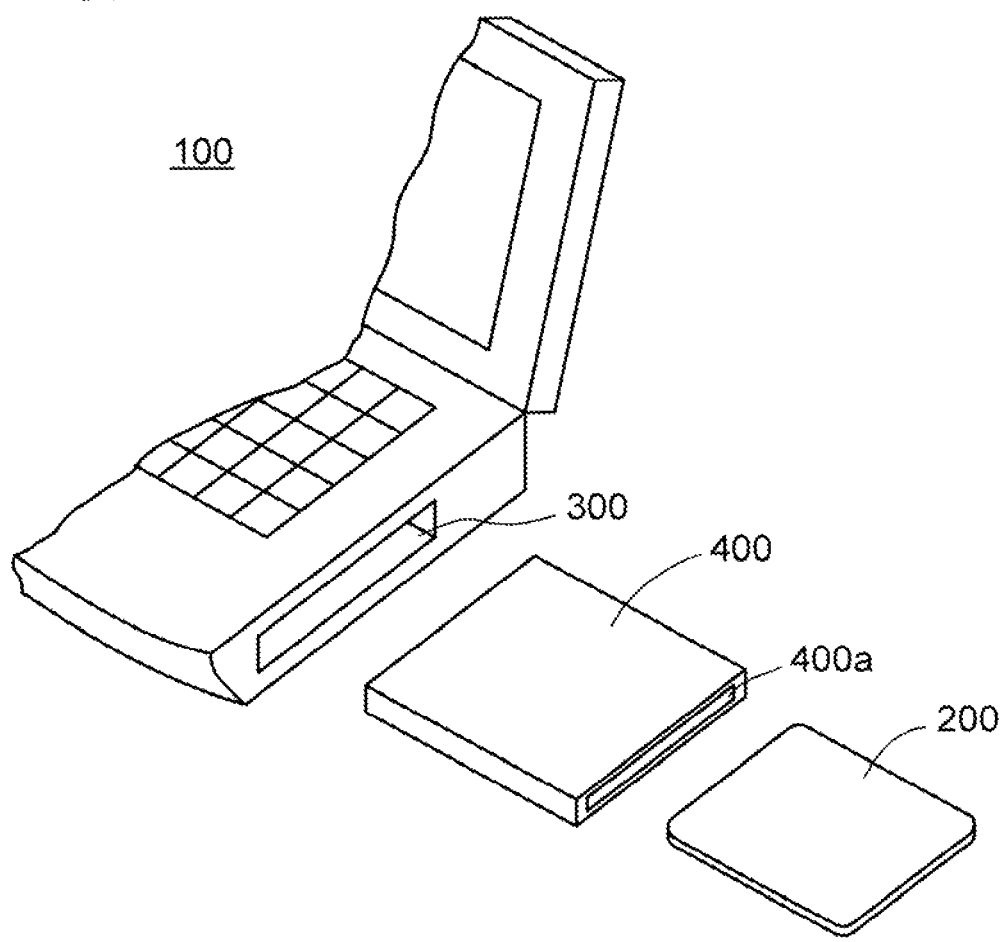
FIG. 1 is a schematic view depicting an example of a card adapter.

FIG. 1 is a schematic view depicting an example of a card adapter. In this section, a description is given of an example where a smart card is used to prevent unauthorized use of a personal computer.

A personal computer 100 illustrated in FIG. 1 is provided with an expansion card slot 300 to which a PCMCIA card is to be inserted. In a case of using a smart card 200 in the personal computer 100, a card adapter 400 compliant with the PCMCIA standard is used.

Specifically, the card adapter 400 is inserted into the expansion card slot 300 of the personal computer 100, and the personal computer 100 and the card adapter 400 are electrically connected to each other. Thereafter, the smart card 200 is inserted into a slit 400a of the card adapter 400. Thus, the smart card 200 is electrically connected to the personal computer 100 via the card adapter 400. Hence, driving electric power is supplied from the personal computer 100 to the smart card 200, and also the smart card 200 may be accessed by the personal computer 100.

Here, it is assumed that ID information for personal identification is written in the smart card 200. Moreover, it is assumed that ID information of one of more persons who are authorized to use the personal computer 100 is registered with the personal computer 100.

As described above, when the smart card 200 is inserted into the card adapter 400 installed in the personal computer 100, the personal computer 100 reads the ID information from the smart card 200 and judges whether the read ID information is one which is registered in advance. The use of the personal computer 100 is allowed when the ID information written in the smart card 200 is the one which is registered in the personal computer 100 in advance.

Incidentally, a user pulls the smart card 200 out of the card adapter 400 when the user finishes using the personal computer 100. At this time, there is a case where the card adapter 400 falls out of the expansion card slot 300 together with the smart card 200. When the card adapter 400 falls out while the personal computer 100 is running, the operation of the personal computer 100 may become unstable or may be suspended (hang up) thereafter. In an extreme case, the fall-out of the card adapter 400 may cause a failure of the personal computer 100.

Some personal computers have an EXPRESS card slot instead of the PCMCIA card slot. A connector portion of the EXPRESS card is smaller in lateral width and has fewer pins compared to that of the PCMCIA card. Thus, when the card adapter compliant with the EXPRESS card standard is used, the card adapter tends to fall out of the expansion card slot more often than the card adapter compliant with the PCMCIA card standard.

(Embodiment)

Figure 2A:
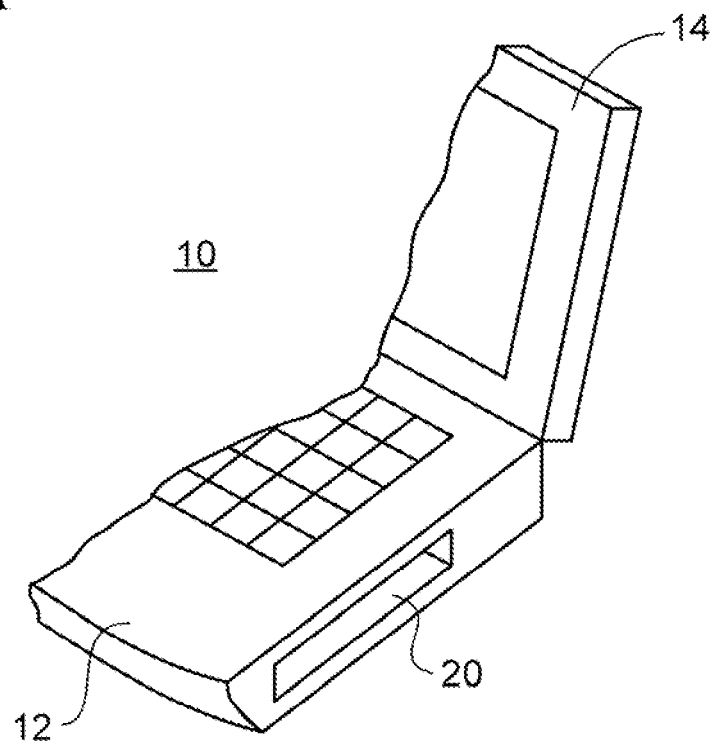
FIG. 2A is a perspective view of a personal computer.
Figure 2B:
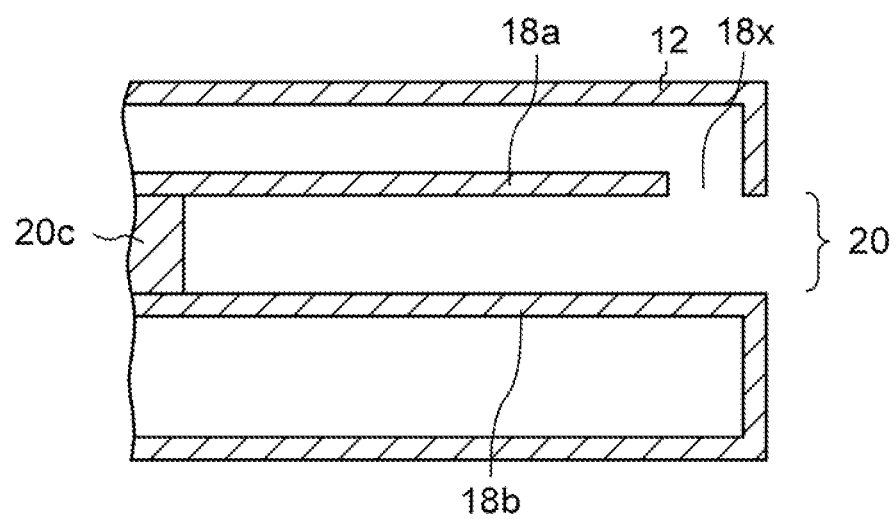
FIG. 2B is a schematic cross-sectional view of an expansion card slot provided in the personal computer.
Figure 3A:
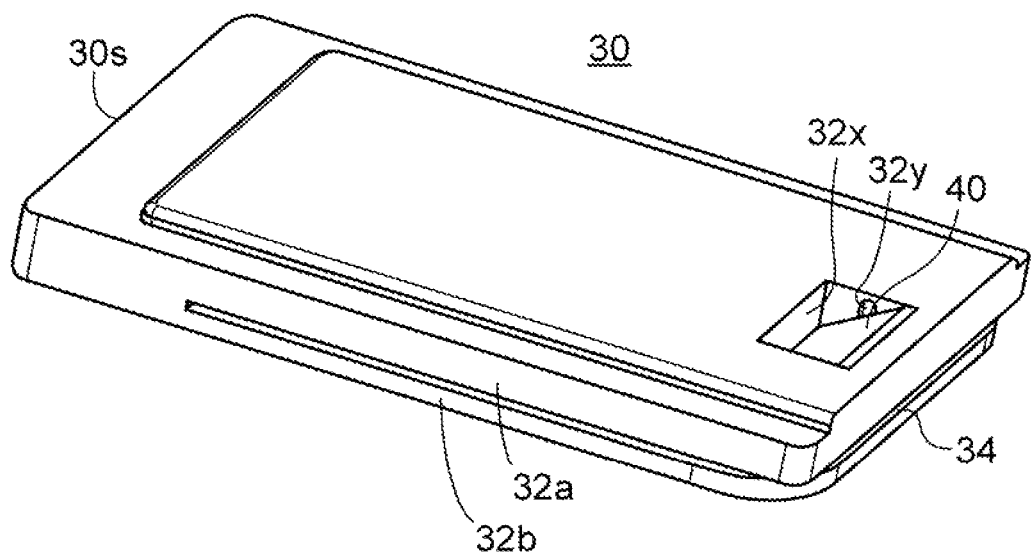
FIG. 3A is a perspective view of a card adapter according to an embodiment.
Figure 3B:
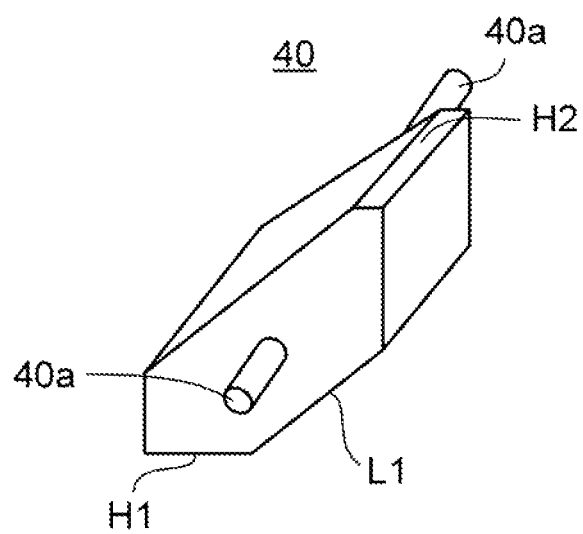
FIG. 3B is a perspective view of a fall-out prevention member of the card adapter.

FIG. 2A is a perspective view of a personal computer and FIG. 2B is a schematic cross-sectional view of an expansion card slot provided in the personal computer. Meanwhile, FIG. 3A is a perspective view of a card adapter according to an embodiment and FIG. 3B is a perspective view of a fall-out prevention member of the card adapter.

Figure 4A:
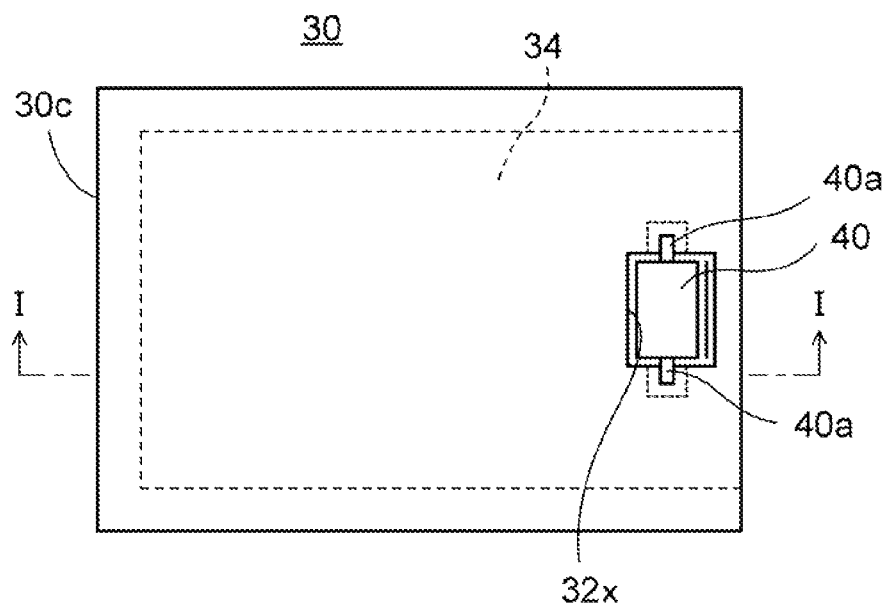
FIG. 4A is a top view of the card adapter according to the embodiment.
Figure 4B:
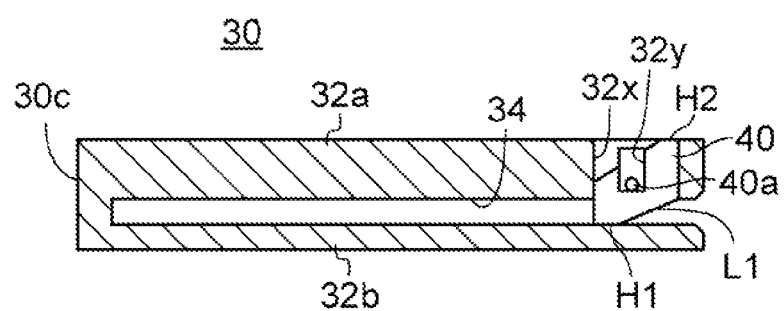
FIG. 4B is a cross-sectional view of the card adapter at a position along the line I-I.
Figure 5:
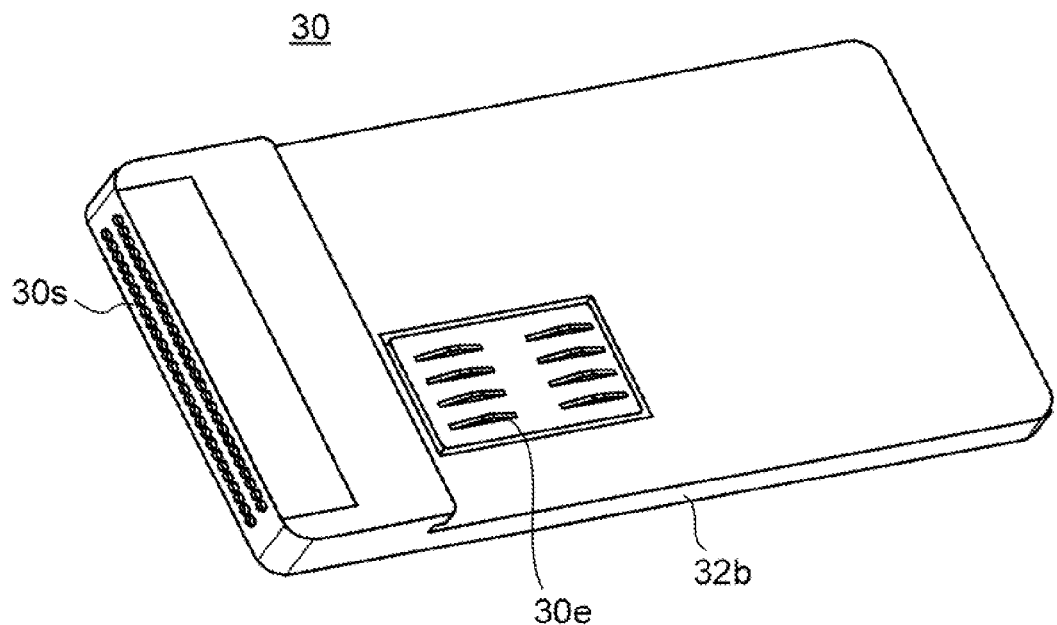
FIG. 5 is a view depicting connection pins which are provided inside the card adapter to be connected to terminals of a smart card.
Figure 6:
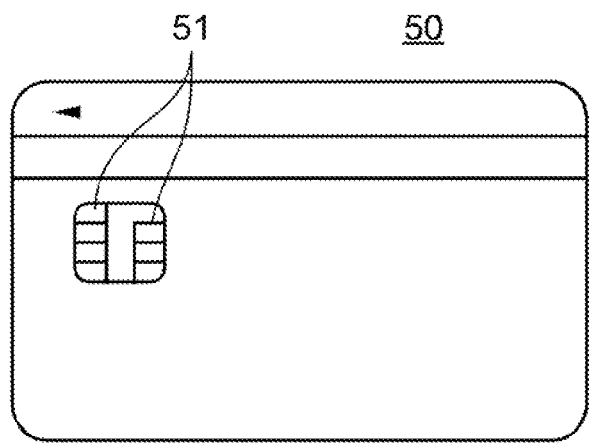
FIG. 6 is a plan view depicting an example of the smart card.

Moreover, FIG. 4A is a top view of the card adapter according to the embodiment and FIG. 4B is a cross-sectional view of the card adapter at a position along the line I-I. Further, FIG. 5 is a view depicting connection pins which are provided inside the card adapter to be connected to terminals of a smart card. Note that, FIG. 5 depicts a state where an upper portion of the card adapter is cut off. Furthermore, FIG. 6 is a plan view depicting an example of the smart card.

As depicted in FIG. 2A, a personal computer 10 includes a personal computer main body portion 12 and a display portion 14 such as a liquid crystal display, the main body portion 12 having a keyboard and the like. An expansion card slot 20 for allowing insertion of the PCMCIA card or the like thereto is provided on a side surface of the main body portion 12 of the personal computer 10.

As depicted in FIG. 2B, an upper partition plate 18a and a lower partition plate 18b are provided in the expansion card slot 20. The PCMCIA card is inserted between the upper partition plate 18a and the lower partition plate 18b.

A pin connection portion 20c in which a plurality of pins (not illustrated) are arranged is provided in the back of the expansion card slot 20. A connector 30s of a card adapter 30 to be described later is connected to the pin connection portion 20c. Moreover, an opening portion 18x which engages with a fall-out prevention member 40 of the card adapter 30 to be described later is provided at a portion of the upper partition plate 18a close to an entrance.

The card adapter 30 is compliant with the PCMCIA card standard and is provided with a slit 34 to which a smart card 50 is to be inserted as depicted in FIGS. 3A, 3B, 4A, and 4B. Moreover, the card adapter 30 is provided with the connector 30s in which a plurality of terminals to be connected to the pin connection portion 20c in the expansion card slot 20 are arranged.

Hereafter, a portion of the card adapter 30 above the slit 34 is referred to as an upper member 32a, and a portion thereof below the slit 34 is referred to as a lower member 32b. Moreover, a front side in a direction in which the card adapter 30 is inserted into the expansion card slot 20 (side in which the connecter 30c is disposed) is referred to as a front-end side, and the opposite side will be referred to as a back-end side.

As depicted in FIG. 5, the lower member 32b of the card adapter 30 is provided with an electrode connection portion 30e to be electrically in contact with an electrode 51 (see FIG. 6) of the smart card 50.

As depicted in FIGS. 3A, 3B, 4A, and 4B, an opening portion 32x reaching from an upper surface of the upper member 32a to the slit 34 is provided on the back-end side of the upper member 32a of the card adapter 30. Moreover, the fall-out prevention member 40 is disposed in the opening portion 32x to be movable in a vertical direction.

As depicted in FIG. 3B, the fall-out prevention member 40 is a member having a cross section substantially in a parallelogram shape, and is disposed while locating inclined surfaces thereof on the upside and the downside. Moreover, upper and lower portions of the fall-out prevention member 40 are chamfered and formed flat.

Furthermore, supporting portions 40a protruding laterally are provided respectively on both sides in the width direction of the fall-out prevention member 40. The supporting portions 40a engage with guide grooves 32y provided on a wall surface of the opening portion 32x. Thus, the fall-out prevention member 40 is configured not to disengage from the opening portion 32x when the fall-out prevention member 40 moves vertically.

Hereinafter, as depicted in FIG. 3B, a lower flat surface of the fall-out prevention member is referred to as a lower end surface H1, an upper flat surface thereof is referred to as an upper end surface H2, and a lower inclined surface thereof is referred to as an inclined surface L1.

As depicted in FIG. 4B, when the smart card is not inserted, the fall-out prevention member 40 is located in a lower position by its own weight, and the lower end surface H1 is in contact with the lower member 32b. Moreover, when the smart card 50 is not inserted, the upper end surface H2 of the fall-out prevention member 40 is located on the same flat plane as the upper surface of the upper member 32a of the card adapter 30 or in a position slightly below the upper surface of the upper member 32a. Furthermore, the inclined surface L1 of the fall-out prevention member 40 faces the outside (toward a slot entrance).

Figure 7A:
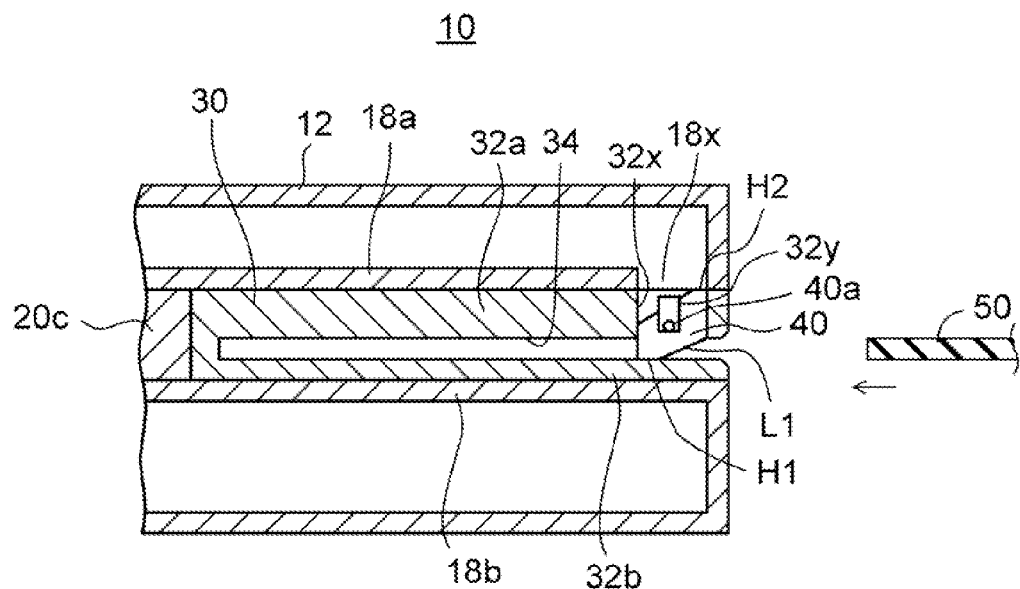
FIGS. 7A to 7D are schematic cross-sectional views for explaining operations of the card adapter when the smart card is inserted.

FIGS. 7A to 7D are schematic cross-sectional views for explaining the operation of the card adapter 30 when the smart card 50 is inserted. It is assumed here that, as depicted in FIG. 7A, the card adapter 30 is installed in the expansion card slot 20 provided in the side surface of the main body portion 12 of the personal computer 10 in an initial state.

Before the smart card 50 is inserted into the card adapter 30, the fall-out prevention member 40 is located below the opening portion 32x by gravity. Moreover, as described above, the lower end surface H1 of the fall-out prevention member 40 is in contact with the lower member 32b, and the upper end surface H2 is located on the same flat plane as the upper surface of the card adapter 30 (upper surface of the upper member 32a) or at the position slightly below the upper surface. In other words, before the smart card 50 is inserted into the card adapter 30, the upper end surface H2 of the fall-out prevention member 40 does not protrude from the upper surface of the card adapter 30.

Figure 7B:
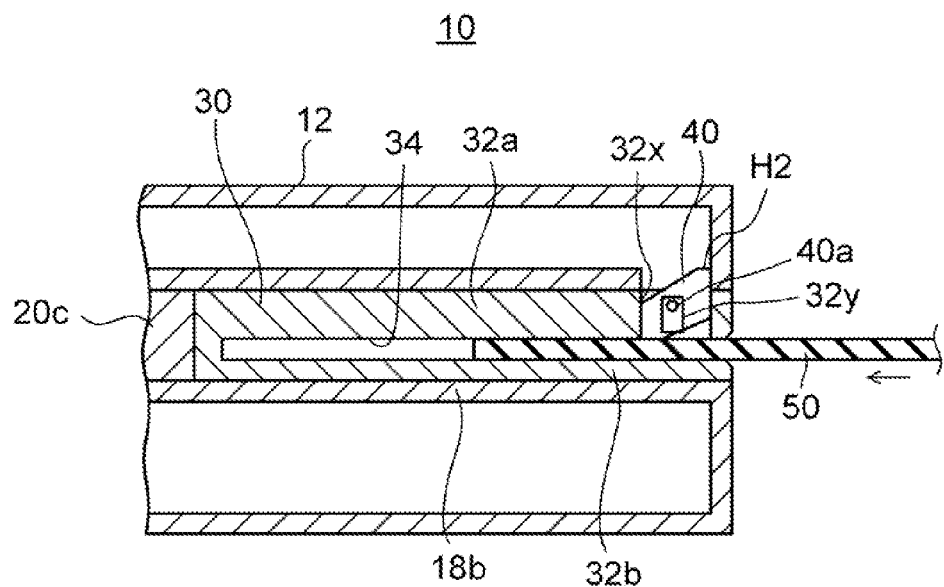

When the smart card 50 is inserted into the slit 34 of the card adapter 30, a front end of the smart card 50 comes into contact with the inclined surface L1 of the fall-out prevention member 40. Then, when the smart card 50 is inserted further into the card adapter 30, the smart card 50 pushes the fall-out prevention member 40 upward. As a result, as depicted in FIG. 7B, a front end portion of the fall-out prevention member 40 comes into contact with a surface of the smart card 50, and is lifted by the thickness of the smart card 50 (about 0.8 mm). Thus, the upper end surface H2 of the fall-out prevention member 40 protrudes slightly above the upper surface of the card adapter 30.

Figure 7C:
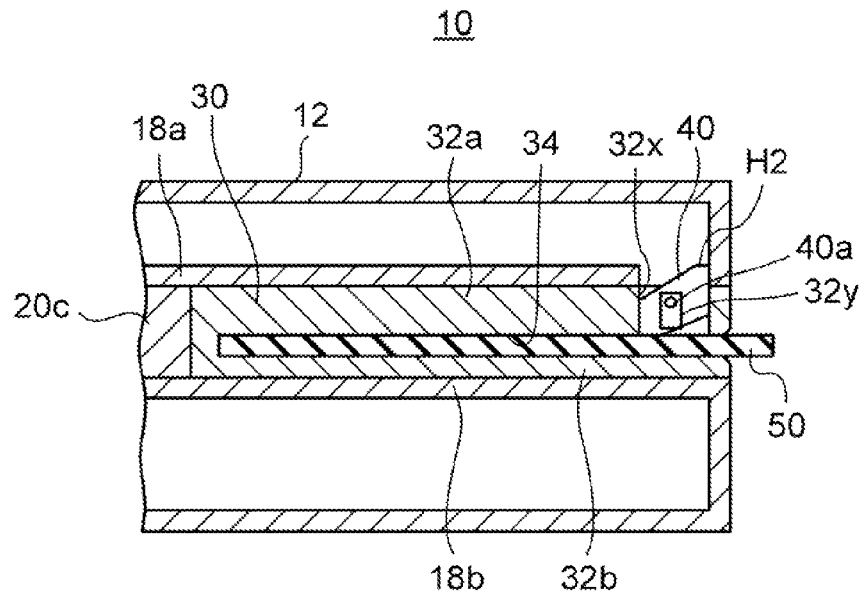

Next, when the smart card 50 is inserted all the way into the card adapter 30 as depicted in FIG. 7C, the electrode 51 of the smart card 50 and the electrode connection portion 30e of the card adapter 30 are electrically connected to each other (see FIGS. 5 and 6).

Thereafter, the ID information written in an IC chip of the smart card 50 is read by the personal computer 10, and is checked with the ID information registered with the personal computer 10 in advance. Then, if the ID information written in the smart card 50 is registered with the personal computer 10, the user is allowed to use the personal computer 10.

Figure 7D:
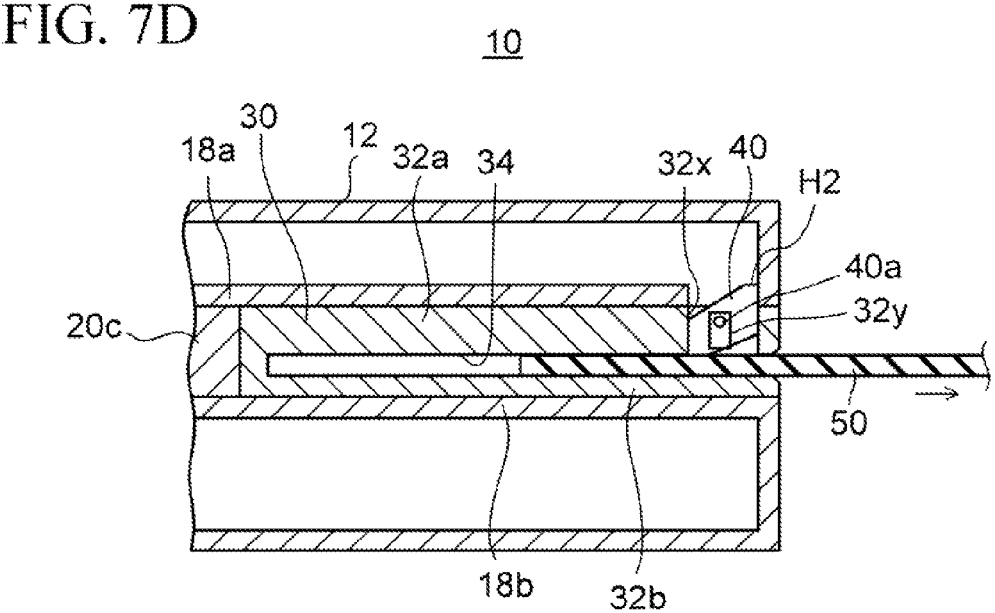

When the use of the personal computer 10 is finished, the user pulls the smart card 50 out of the card adapter 30. At this time, a force in an outward direction is applied also to the card adapter 30. In this embodiment, as depicted in FIG. 7D, an upper end portion of the fall-out prevention member 40 is in contact with an inner wall surface of a case of the personal computer main body portion 12. The smart card 50 may move with the surface thereof sliding on the front end portion of the fall-out prevention member 40. During this movement, the upper end portion of the fall-out prevention member 40 is located in a position in contact with the inner wall surface of the case of the personal computer main body portion 12. Thus, when the smart card 50 is pulled out, the card adapter 30 may be prevented from falling out of the expansion card slot 20 together with the smart card 50.

When the smart card 50 is completely pulled out of the card adapter 30, the fall-out prevention member 40 moves down by gravity, and returns to the state of FIG. 7A.

As described above, in the embodiment, when the smart card 50 is inserted into the slit 34 of the card adapter 30, the upper end portion of the fall-out prevention member 40 protrudes above the upper surface of the card adapter 30. Then, when a force in the outward direction is applied to the card adapter 30 so as to pull the smart card 50 out, the upper end portion of the fall-out prevention member 40 is in contact with the inner wall surface of the case of the personal computer 10 and thus the card adapter 30 may be prevented from falling out.

Thus, it may be possible to avoid unstable operation, suspension of operation (hang-up), and occurrence of a failure of the personal computer 10 attributable to unintended fall-out of the card adapter 30 while the personal computer 10 is running.

Note that the embodiment has described the case where the expansion card slot 20 for PCMCIA cards is provided in the main body portion 12 of the personal computer 10. However, the embodiment may be applied to a case where a card slot is provided in an external expansion device connected to the personal computer 10.

Figure 8:
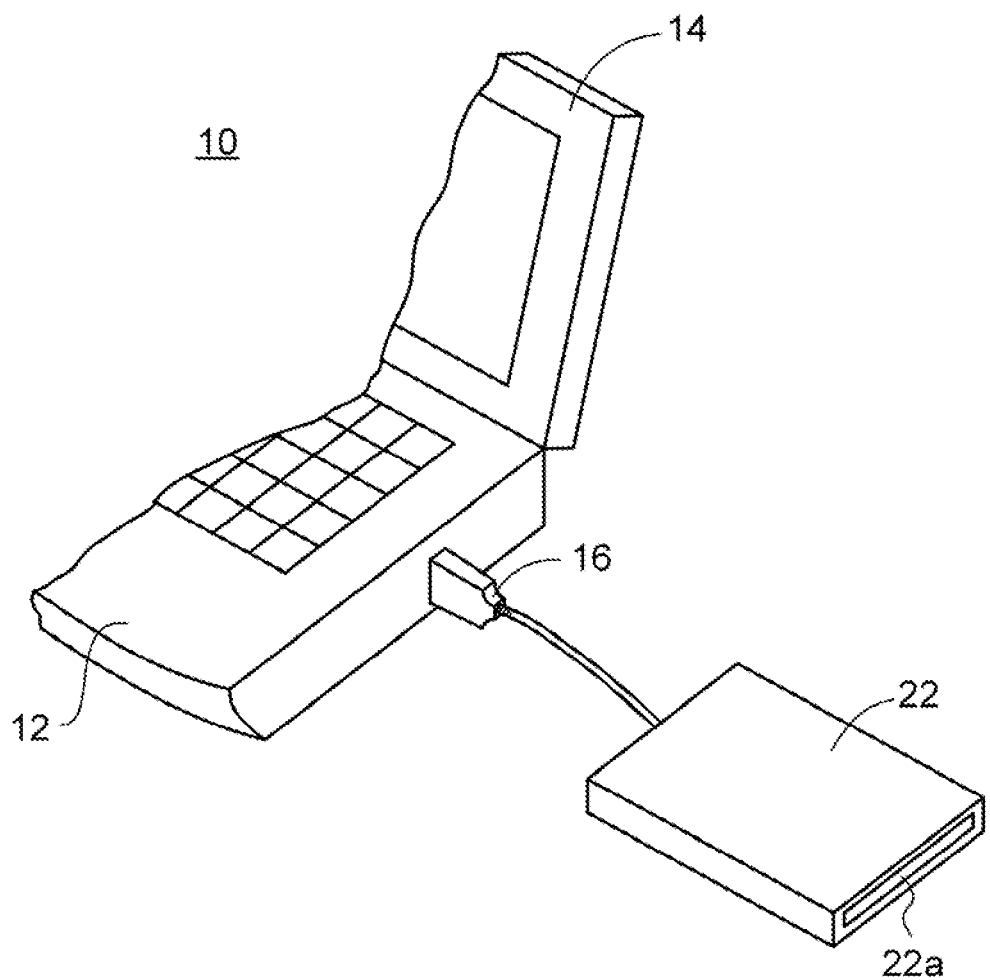
FIG. 8 is a schematic view depicting an example of an external expansion device.

FIG. 8 is a schematic view depicting an example of an external expansion device. In FIG. 8, the same objects as the objects in FIGS. 2A and 2B are denoted by the same reference numerals.

The personal computer 10 illustrated in FIG. 8 is connected to an external expansion device 22 via a USB connection terminal 16. The expansion device 22 has an expansion card slot 22a to which the PCMCIA card is to be inserted. Since the structure inside the expansion card slot 22a is basically the same as the embodiment described above (see FIG. 2B), the description thereof is omitted.

When the card adapter 30 illustrated in FIGS. 3A and 3B is inserted into the expansion card slot 22a of the external expansion device 22 and a smart card is inserted into the slit 34 of the card adapter 30, information written in the smart card may be read by the personal computer 10.

In the embodiment described above, descriptions are given of the card adapters complying with the PCMCIA card standard. However, the disclosed technique is not limited to the card adapters complying with the PCMCIA card standard. The disclosed technique may be applied to various card adapters interposed between a card in which information is stored and a device which reads the information from the card.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. A card adapter configured to electrically connect a card with information written therein and an electronic device to each other, the card adapter comprising:
   an adapter main body;
   a slit provided in the adapter main body and configured such that the card is inserted into the slit;
   an opening portion reaching from an outer surface of the adapter main body to the slit; and
   a fall-out prevention member disposed in the opening portion and being movable in a thickness direction of the adapter main body, wherein
   an elongated groove extending in the thickness direction of the adapter main body is formed in a wall surface of the opening portion,
   the fall-out prevention member is provided with a protrusion engaging with the elongated groove and being movable in the thickness direction of the adapter main body along the elongated groove, and
   when the card is inserted into the slit, the fall-out prevention member comes into contact with the card to be pushed up in the thickness direction of the adapter main body, and a portion of the fall-out prevention member protrudes from the outer surface of the adapter main body.

2. The card adapter according to claim 1, wherein, when the card is not inserted in the slit, a lower portion of the fall-out prevention member is disposed in the slit by gravity and the fall-out prevention member does not protrude from the outer surface of the adapter main body.

3. The card adapter according to claim 1, wherein an electrode connection portion to be connected to an electrode of the card is provided in the slit of the adapter main body.

4. An electronic device comprising:
   a case having a slot; and
   a card adapter configured to be installed in the slot and to electrically connect the electronic device and a card with information written therein to each other, the card adapter comprising:
   an adapter main body;
   a slit provided in the adapter main body and configured such that the card is inserted into the slit;

an opening portion reaching from an outer surface of the adapter main body to the slit; and a fall-out prevention member disposed in the opening portion and being movable in a thickness direction of the adapter main body, wherein an elongated groove extending in the thickness direction of the adapter main body is formed in a wall surface of the opening portion, the fall-out prevention member is provided with a protrusion engaging with the elongated groove and being movable in the thickness direction of the adapter main body along the elongated groove, and when the card is inserted into the slit, the fall-out prevention member comes into contact with the card to be pushed up in the thickness direction of the adapter main body, and a portion of the fall-out prevention member protrudes from the outer surface of the adapter main body to come into contact with an inner wall surface of the case.

* * * * *